(12) United States Patent
Caraballo

(10) Patent No.: US 6,698,558 B1
(45) Date of Patent: Mar. 2, 2004

(54) SAFETY BRAKE SYSTEM FOR GARAGE DOORS

(76) Inventor: Abelardo Caraballo, 3381 SW. 130th Ave., Miami, FL (US) 33175

(*) Notice: Subject to any disclaimer, the term of this patent is extended or adjusted under 35 U.S.C. 154(b) by 0 days.

(21) Appl. No.: 10/171,739

(22) Filed: Jun. 17, 2002

(51) Int. Cl.⁷ ................................................. F16F 9/512
(52) U.S. Cl. ................. 188/266.1; 188/152; 188/266.8; 188/272; 188/282.5; 188/318; 49/322
(58) Field of Search ................................ 188/152, 266, 188/283, 318, 322.22, 322.15, 317, 266.1, 266.2, 266.8, 272, 275, 280, 282.5, 282.8, 285, 300; 303/1; 16/51, 82; 49/199, 137, 322; 160/191, 192, 188, 189

(56) References Cited

U.S. PATENT DOCUMENTS

| | | | | |
|---|---|---|---|---|
| 2,755,081 A | * | 7/1956 | Johnson et al. | |
| 3,254,699 A | * | 6/1966 | Wanner | |
| 3,605,340 A | * | 9/1971 | Nolan et al. | |
| 3,840,220 A | | 10/1974 | McConnell | 267/69 |
| 4,417,418 A | | 11/1983 | Warning | 49/199 |
| 4,669,365 A | * | 6/1987 | Stoll | |
| 4,829,628 A | * | 5/1989 | Vuksic | |
| 4,891,908 A | | 1/1990 | Aquilina | 49/199 |
| 5,040,332 A | * | 8/1991 | Aquilina | |
| 5,090,522 A | * | 2/1992 | Korff | |
| 5,129,311 A | * | 7/1992 | Hart | |
| 5,706,552 A | * | 1/1998 | Hsieh | |
| 5,931,212 A | * | 8/1999 | Mullet et al. | |
| 6,070,641 A | * | 6/2000 | Budetti | |
| 6,079,524 A | * | 6/2000 | Hung | |
| 6,279,268 B1 | * | 8/2001 | Beaudoin et al. | |
| 6,352,271 B1 | | 3/2002 | Babcock | |
| 2002/0189913 A1 | | 12/2002 | Lernieux | |

FOREIGN PATENT DOCUMENTS

JP          5-122921      *  5/1993

* cited by examiner

Primary Examiner—Douglas C. Butler
(74) Attorney, Agent, or Firm—J. Sanchelima; A. Bordas

(57) ABSTRACT

A brake system for garage doors including a piston assembly movable within a longitudinal housing assembly and including a central through opening and a threaded bushing rigidly mounted to the piston assembly. A threaded axle is cooperatively received by the threaded bushing so that the rotation of the axle causes the piston assembly to move at a predetermined speed longitudinally within the housing assembly. Longitudinal connecting apertures permit the flow of fluid adjacent to the ends of the piston assembly to flow through. A flapper valve assembly is mounted to one of the ends of the piston assembly by a separating spring member. When the movement of the piston assembly exceeds a predetermined magnitude, the spring member is compressed eliminating the clearance and closing the connecting apertures. This prevents any additional flow and rotational movement of the threaded axle, which in turn is mechanically connected to the counterbalance axle of an opening and closing mechanism for garage doors.

4 Claims, 3 Drawing Sheets

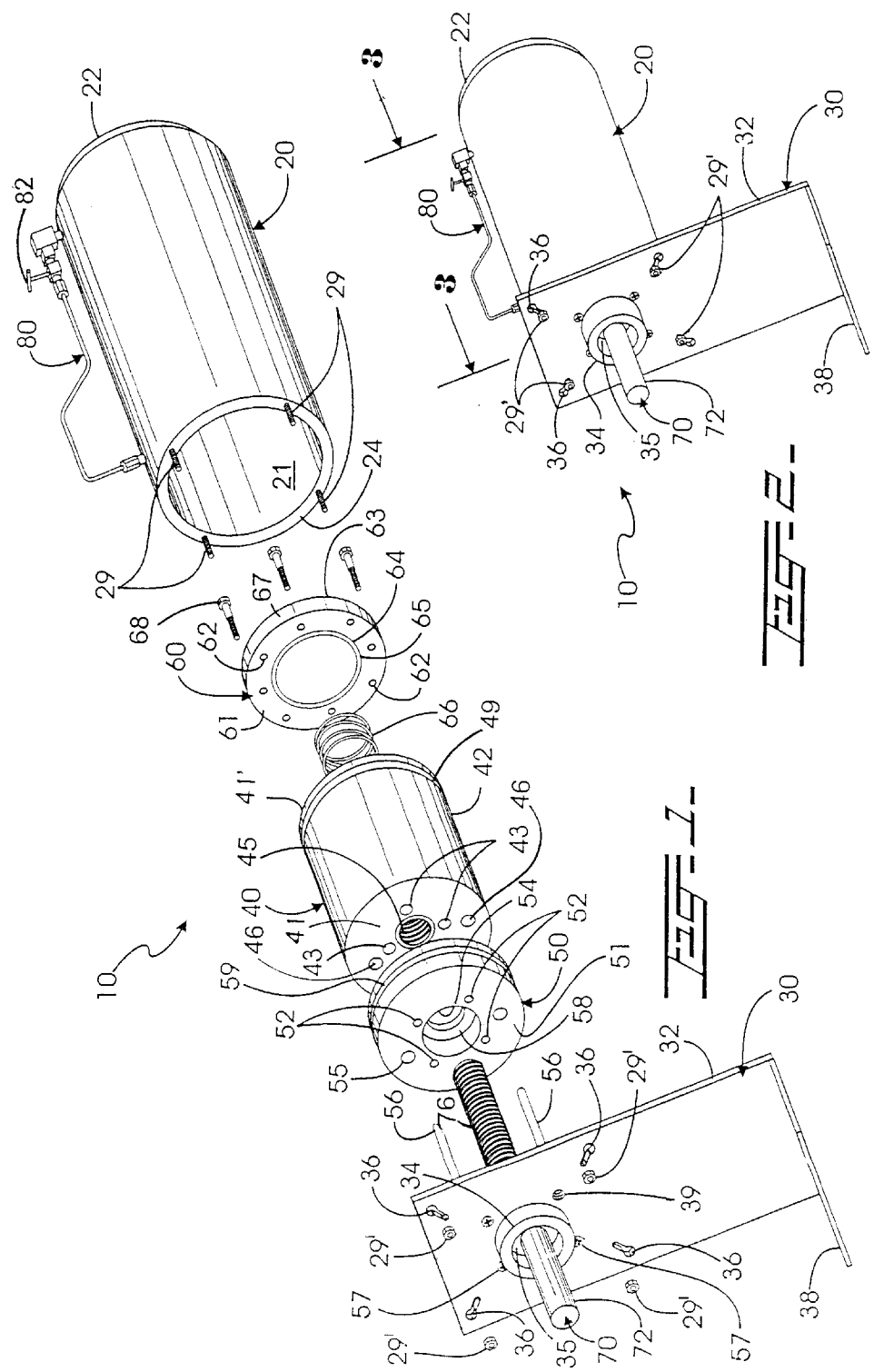

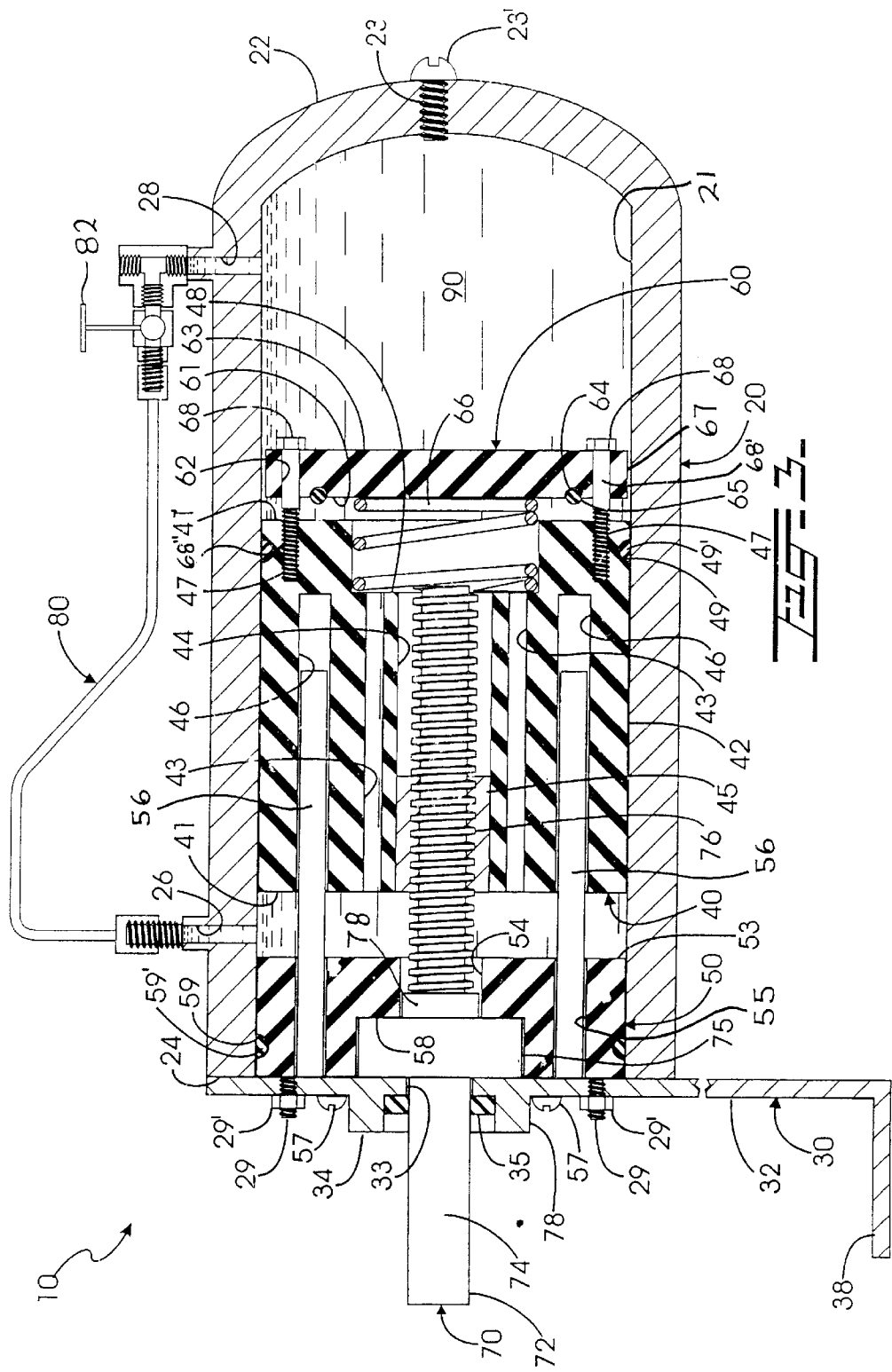

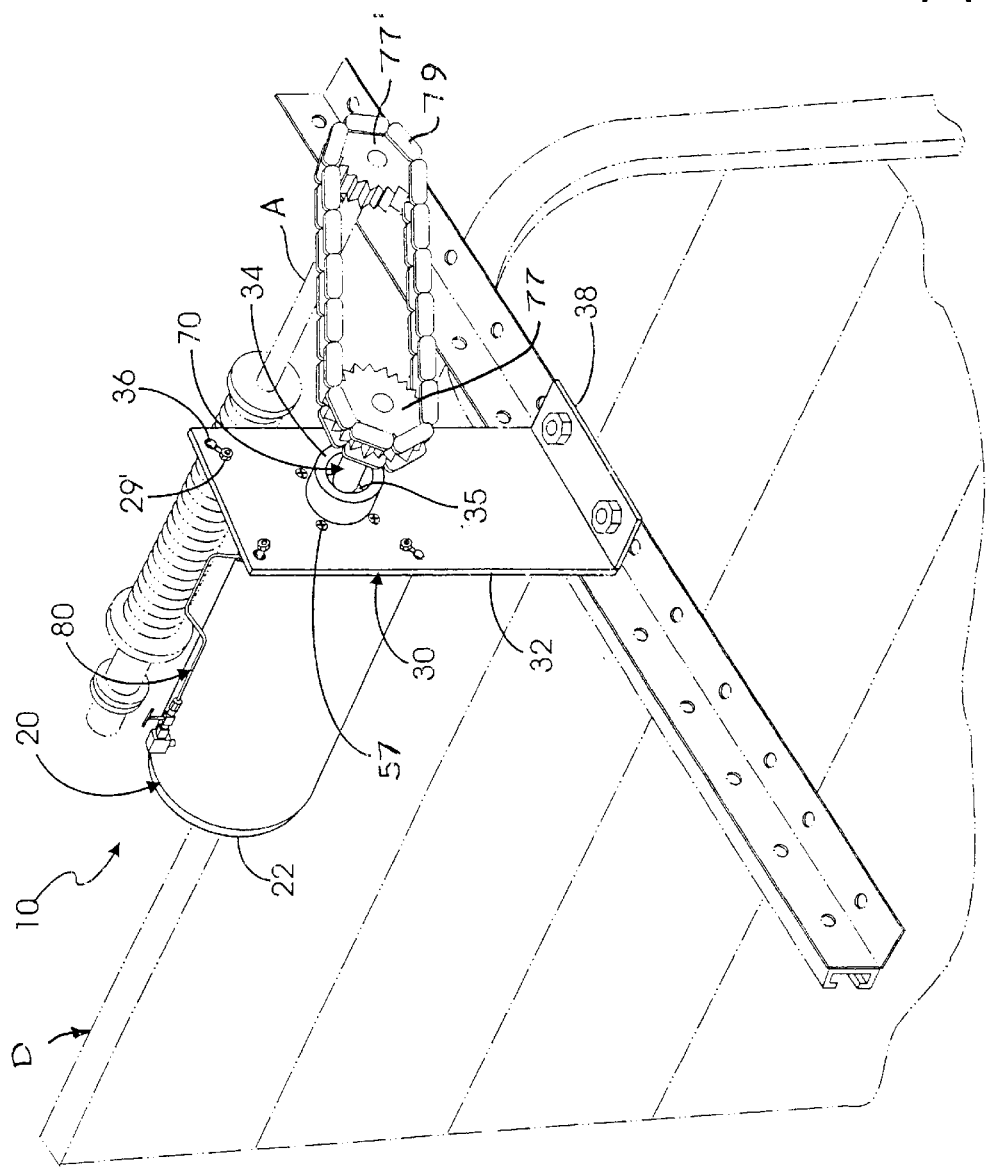

SAFETY BRAKE SYSTEM FOR GARAGE DOORS

BACKGROUND OF THE INVENTION

1. Field of the Invention

The present invention relates to a safety brake system, and more particularly, to a safety brake system for garage doors.

2. Description of the Related Art

Conventional counter-weight spring systems used in garage doors have limited life. Therefore, when the spring breaks, the garage door falls down suddenly with potential damage to persons and/or objects in its path.

Many designs for safety mechanisms for garage door systems have been designed in the past. None of them, however, include a safety brake that stops the movement of a garage door when the mechanism for opening and closing breaks and drops suddenly. The present invention secures the door when the spring member breaks and permits a user to selectively bypass the safety brake in a controlled manner.

The typical weight of a garage door is between 200 and 400 pounds. There are some mechanisms relatively safe for opening and closing garage doors. However, they have parts (such as springs) with limited life. One of these mechanisms is described in U.S. Pat. No. 4,891,908 issued to Anthony G. Aquilina on Jan. 9, 1990 for a pneumatic door opener. Aquilina's patented door operator system includes a counterbalancing assembly such as an axial torsion spring (114) mounted through a bar (115), which is secured above the door. A cable (116) is secured to the door and wound at on a drum (118). The cable (116) is axially driven by the torsion spring (114). Once the torsion spring (114) breaks, the door falls down suddenly. Cylinder 10 includes a pressurized fluid but it also requires a source 126 to operate. If spring (114) breaks, the pressurized fluid assembly will not act as a brake. In the present invention the pivot bolt is directly connected to the Aquilina's bar (115). In the event that the spring loaded counterbalance mechanism fails the safety brake system of the present invention prevents the garage door from falling down.

Applicant believes that another related reference corresponds to U.S. Pat. No. 3,840,220 issued to McConnel et al. on Oct. 8, 1974 for a hydro-pneumatic counterbalance. McConnel's patented device includes an inner cylinder having a counterbalance piston under hydraulic pressure and an outer concentric cylinder containing a highly pressurized gaseous fluid. An internal needle valve controls the communication between the two cylinders. The rate at which the piston moves is determined by the adjustment of the needle valve. However, it differs from the present invention because the McConnel's patented invention is not a security device. It only controls the speed in the opening and closing traps and high weight garage doors. In fact, if the typical electrical motor mechanism is used it will have an extra load besides the weight of the door. This high cost device needs a high cost installation and maintenance, but it does not prevent the garage door from falling down when any of the six (6) instructions for installing the counterbalance unit on doors (Col. 5, lines 8 through 60) detailed in the patent is not met. The present invention is a security device that protects the doors from falling down when its mechanism fails and it is completely "invisible" until it is called to operate.

Another related reference corresponds to U.S. Pat. No. 4,417,418 issued to Warning in 1993 for an air powered door operation apparatus. Warning's patent mentions braking and safety features such as an adjustable needle valve (Col. 3, lines 30 through 35). These features are only for limiting the amount of upward travel of the rod and the piston of the unpressurized cylinder. The present invention on the other hand, does not interfere with the opening/closing system of the door. It is incorporated to the rotational movement of the tension bar connected to the door without affecting its operation. Furthermore, in the present invention the flap valve provides a security device that stops the door when a sudden movement is detected.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a safety brake system that prevents a garage door from falling down when the opening and closing mechanism fails.

It is another object of this invention to provide a safety brake system that is volumetrically efficient and can be readily mounted to most existing garage doors systems.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an exploded view of one of the preferred embodiments for the safety brake system for garage doors in accordance with the teachings of the present application.

FIG. 2 shows an isometric view of the embodiment for the present invention illustrated in the previous figure.

FIG. 3 illustrates a cross-sectional view taken along line 3—3 from FIG. 2.

FIG. 4 shows an isometric view of the present invention mounted to a conventional garage door.

DETAILED DESCRIPTION OF THE PREFERRED EMBODIMENT

Referring now to the drawings, where the present invention is generally referred to with numeral 10, it can be observed that it basically includes housing assembly 20, piston assembly 40, bearing plug assembly 50, flapper valve assembly 60, axle assembly 70, bypass 80 and fluid 90.

Housing assembly 20 has a substantially cylindrical shape with end 22 and open end 24, as seen in FIGS. 1 and 2. End 22 has threaded opening 23 in the center, as seen in FIG. 3. Screw member 23' is received by threaded opening 23. Through openings 26 and 28 are located at predetermined distances with respect to ends 24 and 22, respectively. End 24 is the open end of housing assembly 20. Plate assembly 30 closes open end 24 with fastening members 29 and nuts 29' keeping the former against end 24. Plate assembly 30 has a substantially and "L" shape to facilitate mounting it at a fixed point adjacent to the mechanism of garage doors D (partially shown in FIG. 4). Plate assembly 30 includes longer plate leg 32 and shorter plate leg 38 perpendicularly disposed with respect the former. Longer plate leg 32 includes central opening 33, as seen in FIG. 3, cylindrical protrusion member 34 extending outwardly and perpendicularly therefrom. Seal member 35 is housed within cylindrical protrusion member 34. Plate assembly 30 is mounted to housing 20 and kept in place with fastening members 29 mounted thereon through openings 36 and nuts 29' at the distal end.

Piston assembly 40 is slidably and snugly mounted inside housing assembly 20. Piston assembly 40 includes ends 41 and 41', as best seen FIG. 3. Connecting apertures 43 extend longitudinally from end 41 to counterbore 48 centrally disposed on end 41'. Central opening 44 extends longitudinally from counterbore 48 to the center of end 41. Threaded bushing 45 is rigidly mounted within through opening 44, adjacent to end 41. Guiding apertures 46 extend longitudinally from end 41 and they are cooperatively positioned to receive guiding pin members 56. Peripheral groove 49 snugly receives O-ring 49' which is compressed therein by the internal surface 21 of housing 20.

Bearing plug assembly 50 includes end 51 and end 53, with central through opening 54 extending from end 51 and ending at a counterbore 58 adjacent to end 53, as seen in FIGS. 1 and 3. End 51 of bearing plug assembly 50 is securely attached to longer plate leg 32 with fastening members 57. Fastening members 57 pass through openings 39 and enter holes 52 thereby firmly holding bearing plug assembly 50 in place. Guiding members 56 are rigidly mounted to longer plate leg 32. Guiding members 56 pass through openings 55. Guiding apertures 46 have cooperative dimensions to receive guiding members 56 therein. Guiding members 56 slidably enter in guiding apertures 46 to movably guide piston assembly 40 within housing 20. Peripheral groove 59 snugly receives O-ring 59' and the latter is compressed against internal surface 21 of housing 20.

Flapper valve assembly 60 has a substantially cylindrical shape and is mounted to end 41' within housing 20 facing end 22. The diameter of flapper valve assembly 60 is smaller than the internal diameter of housing 20. Flapper valve assembly 60 includes end 61,.through openings 62, end 63, groove 64, O-ring 65, spring member 66 and bolts 68. Circular groove 64 extends on the surface of end 61 at a predetermined distance from the peripheral edge 67 of flapper valve 60. O-ring 65 is partially received within groove 64. Spring member 66 has cooperative dimensions to be received within counterbore 48. Spring member 66 urges flapper valve assembly 60 away from end 41' against the head of bolts 68 coacting with the surface of end 63. Bolts 68 are rigidly mounted to end 41' allowing for a clearance between end 41' and end 61. The heads of bolts 68 coact with end 63, limiting the travel of flapper valve 60. Shanks 68' of bolts 68 pass through openings 62 and threaded bolt end 68" is received by threaded openings 47. Threaded openings 47 are cooperatively disposed on end 41' of piston assembly 40 to coincide with openings 62. In this manner, flapper valve assembly 60 moves inside housing assembly 20 when piston assembly 40 moves within a predetermined speed magnitude range. The fluid to the right of flapper valve assembly 60 pass through the clearance between peripheral edge 67 and internal surface 21. When piston assembly moves rapidly above a predetermined speed magnitude, the fluid 90 inside housing 20 adjacent to end 22 exerts a force against end 63 overcoming the bias of spring 66. This happens because fluid 90 cannot pass through the clearance between edge 67 and surface 21 fast enough. When the clearance between end 61 and end 41' is closed, O-ring 65 sits on end 41' preventing the passage of any more fluid through counterbore 48 and connecting apertures 43.

Axle assembly 70 comprises external axle portion 72 and ball bearing 75. External axle portion 72 includes pivot bolt 74, stopper disc 78 and threaded portion 76. External axle portion 72 passes through central opening 33. Ball bearing 75 is inserted to pivot bolt 74. The position of ball bearing 75 in pivot bolt 74 is determined by stopper 78. Counterbore 58 has cooperative dimensions to receive ball bearing 75. Counterbore 58 and longer plate leg 32 limit the position of ball bearing 75 within bearing plug assembly 50. Threaded bushing 45 is rigidly mounted to central opening 33 next to end 41. Threaded portion 76 is rotatably advanced inside threaded bushing 45. External axle portion 72 is connected to torsion axle A of opening/closing mechanism of garage door D, as shown in FIG. 4, through chain 79 trained over sprocket members 77 and 77'.

The rotational movement of axle A is transmitted to axle assembly 70 which in turn causes threaded bushing 45 to advance longitudinally inside housing 20. If the rotational speed increases beyond a predetermined magnitude, the longitudinal guided advancement of threaded bushing 45 is transmitted through spring member 66 to flapper valve assembly 60 which forces the resistance of fluid 90 on the right. This resistance causes spring member 66 to compress bringing O-ring 65 against the surface of end 41' preventing the passage of any additional fluid 90 through connecting apertures 43.

Bypass assembly 80 connects openings 26 and 28 of housing assembly 20. The user manually operates bypass assembly 80, when necessary. If the system for opening/ closing garage door D breaks, a user can slowly close the garage door by opening valve 82 of bypass assembly 80.

Fluid 90 can be preferably implemented with commonly used fluids such as glycol (antifreeze). Fluid 90 fills the free space inside housing assembly 20 and with the movements of piston assembly 40 passes through it from one side to the other. Fluid 90 is forced to go through connecting apertures 43 in piston assembly 40. Seal member 35 avoids the leakage of fluid 90 outside housing 20. Fluid 90 can be changed through threaded opening 23.

The dimensions (diameter) of connecting apertures 43 are selected so that piston assembly 40 can not be moved faster than a predetermined speed. In this manner, if the mechanism for opening/closing garage door D breaks, or a sudden movement occurs, flapper valve 60 closes connecting apertures 43. Blocking the flow of fluid 90 through connecting apertures 43 prevents any further movement of piston assembly 40. In this manner garage door D stops and remains in the same position until the user opens valve 82 of bypass assembly 80.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A brake system for garage doors, comprising:
   A) a sealed longitudinal housing assembly containing a fluid;
   B) a piston assembly slidably and snugly movable within said housing assembly and including first and second ends and a central through opening longitudinally extending between said first and second ends and a threaded bushing rigidly mounted to said piston assembly coaxially within said through opening, said piston assembly further including at least one connecting aperture extending longitudinally between said first and second ends;

C) guiding means for preventing the rotation of said piston assembly;

D) a threaded axle having a portion external of said housing assembly and a threaded portion cooperatively meshed with said threaded bushing so that the rotation of said threaded axle causes said piston assembly to move longitudinally within said housing assembly and said threaded axle being connected to a counterbalance axle of an opening and closing mechanism for garage doors thereby transmitting the rotational movement of said counterbalance axle to said threaded axle; and E) a flapper valve assembly mounted to said first end through separating spring means and further including means for sealing said at least one connecting aperture when the force exerted by said separating spring means is overcome by the transmission of a rotational movement that exceeds a predetermined magnitude that causes said flapper valve assembly to be exposed to the force exerted by said fluid on the path of said flapper valve assembly.

2. The brake system set forth in claim 1, further including:

F) bypass means for selectively permitting the fluid adjacent to both ends of said piston assembly to flow back and forth.

3. The brake system set forth in claim 2 wherein said housing assembly includes bearing means for supporting said threaded axle.

4. The brake system set forth in claim 3 further including a plate assembly mounted to said housing assembly and further including means for mounting said plate assembly to a fixed location for cooperative engagement of said threaded axle to said counterbalance axle.

\* \* \* \* \*